Oct. 28, 1947.   M. L. STANPHILL   2,429,968
NEURO-VASO DETECTOR
Filed Oct. 22, 1945

INVENTOR.
Martin L. Stanphill
BY
Robert J. Dennison
atty.

Patented Oct. 28, 1947

2,429,968

UNITED STATES PATENT OFFICE 2,429,968

NEURO-VASO DETECTOR

Martin L. Stanphill, Denison, Tex.

Application October 22, 1945, Serial No. 623,828

5 Claims. (Cl. 128—2.1)

My invention relates to diagnostic methods, and more particularly to a process for measuring and evaluating the high-frequency impedance property of the human body.

In the diagnosis of pathological conditions of the human system, it is the practice to observe the degree of change of certain physical properties, in order to assess therefrom the nature of the disorder. It is well known that the normal system has a characteristic temperature, blood pressure, electrocardiac impulse, basal metabolism, etc. Abnormalities of one or more of these properties, which are relatively uniform in healthy individuals, aid the diagnostician in determining the ailment and the progress of its development.

The primary object of my invention is to provide a new diagnostic adjunct.

Another object of my invention is to provide a method for determining the high-frequency electric impedance of the human body.

A further object of my invention is to provide a process for detecting physiological changes in the body or parts thereof, which result in change of high-frequency electric impedance.

Still another object of my invention is to provide an electric circuit for determining the high-frequency impedance of the human body.

Still a further object of my invention is to provide a rotatable-coil type of variable air-core transformer in which the rotatable coil is asymmetrically disposed with respect to its axis of rotation.

With these and other objects in view which will become apparent from the ensuing description and claims, the following describes the details of construction and combination of parts of a specific embodiment of my invention, which I illustrate as an example, and which will best be understood when read in conjunction with the accompanying drawing, in which:

Figure 3:
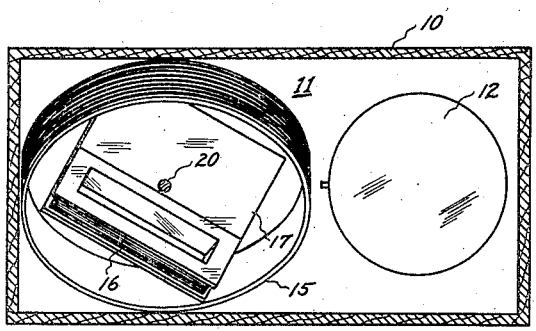
Fig. 3 is a horizontal section of the device on the line 3—3 of Fig. 1.
Figure 4:
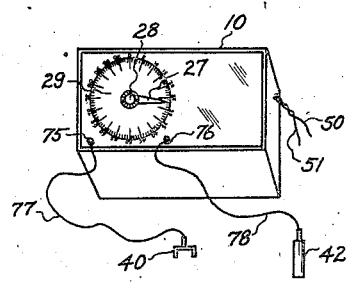
Fig. 4 is a perspective external view of my detector.
Figure 1:
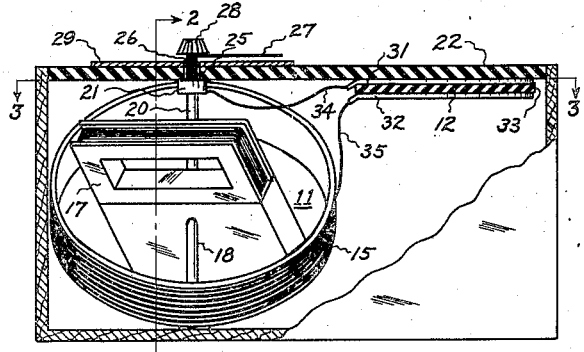
Fig. 1 is a fragmentary side-elevational schematic view of my neuro-vaso detector.
Figure 2:
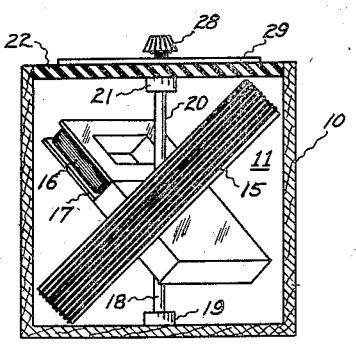
Fig. 2 is a vertical transverse section of my detector on the line 2—2 of Fig. 1.

Referring to the drawing, I have shown in Figs. 1 to 4 my neuro-vaso detector comprising essentially a rectangular housing 10, of wood or other durable electric insulating material, enclosing a variable air-core transformer 11, a disc condenser 12, and auxiliary electronic equipment. The transformer 11 is composed of a cylindrical stator coil 15 with its axis in a transverse vertical plane and inclined at 45 degrees to the horizontal as illustrated in Fig. 2, and rotor coil 16 wound on a rectangular frame 17 mounted for rotation on a vertical axis which passes through the center of the stator coil 15. The rotor coil 16 is inclined at 45 degrees to the rotational axis and is asymmetrically offset with respect thereto so that the rotor winding 16 is completely to one side of the axis of rotation above the center of the stator coil 15. The stator or primary winding 15 is comprised of a relatively few turns of heavy copper wire, for example No. 14 A. W. G., and the rotor or secondary winding 16 is comprised of many turns of relatively fine wire, for example No. 21 A. W. G.

The rotor frame 17 is mounted for rotation between two aligned vertical metal shafts electrically insulated from each other. The lower shaft 18 is journaled in a precision thrust ball bearing 19 attached to the base of the housing 10, and the upper shaft 20 is journaled in a precision ball bearing 21 secured to the housing cover plate 22 comprised of electrical insulating material of good quality, such as synthetic resin. The shafts 18 and 20 are respectively electrically connected to the ends of the winding 16 so that the bearings 19 and 21 constitute electric terminals therefor, thus providing complete freedom of rotation.

Extending upwardly of the shaft 20, through the bearing 21 and an aperture 25 in the plate 22, is a shaft extension 26 of insulating material carrying a pointer 27 and a rotor positioning knob 28 external to the housing 10. A graduated metal disc 29 of large diameter and having a central opening to receive the shaft extension 26 is centered over the opening 25, to provide an indication of the rotor orientation, and to afford shielding of the internal circuit from any body capacity introduced by the operator.

Attached flatwise beneath the plate 22, longitudinally adjacent the transformer 11, is the electric condenser 12 comprising two metal plates 31 and 32 separated by a dielectric disc 33 of molded resin or the like. The condenser 12 is connected directly across the rotor coil 16 by a lead 34 connecting the plate 31 to the bearing 21 and a lead 35 connecting the plate 32 to the bearing 19.

It will be readily understood that maximum inductive coupling of the transformer 11 occurs when the rotor coil 16 is aligned with the stator coil 15, that is, when the coil 16 is rotated toward the back of the housing viewed from the front in Fig. 1, and that there is a zero coupling when the coil is toward the front. When the coil 16 is in the extreme left or right position of the device as viewed in Fig. 1, the inductive coupling of the transformer is at an intermediate value and is identical for both positions. However, it will be observed that when the coil 16 is in the extreme position to the right it will be in close proximity to the condenser 12, and will be relatively far removed therefrom when in the extreme leftward position. There will therefore be a considerable difference in capacity coupling between the coil 16 and the condenser 12, depending on the orientation of the rotor.

The applicators of the device comprise a channel-shaped palpator or field plate 40, of steel or other metal, having an insulated back from which protrudes outwardly an insulated handle 41, to be grasped by the operator; and a cylindrical vibrating electrode 42 of brass, copper or like metal, to be grasped in the hand of the patient.

Figure 5:
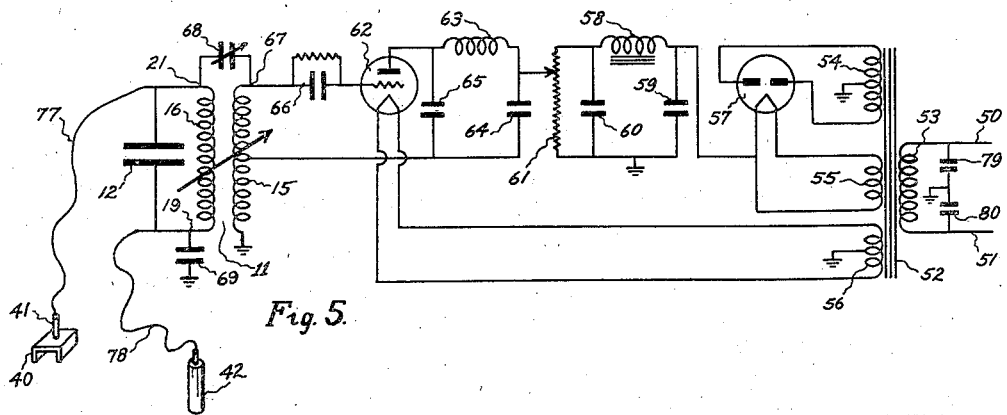
Fig. 5 is a schematic wiring diagram of the electric circuit including the electrodes for application to the body of the patient.

The electric circuit of the device is shown in Fig. 5. Alternating current is supplied via leads 50 and 51 to the primary winding 53 of a transformer 52 having a high-voltage secondary winding 54 and two low-voltage filament supply secondary windings 55 and 56. The high-voltage winding 54 is grounded at its midpoint and has its ends connected to the respective plates of a thermionic full wave rectifier 57 whose filament current is supplied from the winding 55. Connected to the filament circuit of the rectifier 57 is a filter choke comprising a choke coil 58 coupled to ground through high-capacitance condensers 59 and 60 and feeding a voltage divider 61. The voltage divider 61 supplies the proper plate voltage to a triode 62 through a high-frequency filter comprising an inductor 63 and filter condensers 64 and 65. Current is supplied to the filament of the triode 62 from the winding 56 which is grounded at its midpoint. The grid of the triode 62 is connected in series with a grid leak and condenser assembly 66 to one end or terminal 67 of the stator coil 15. The other end of the stator coil 15 is grounded and a mid-tap is connected to the condensers 64 and 65. A variable condenser 68 is connected between the terminal 67 of the coil 15 and the terminal 21 of the coil 16. The condenser 12 is connected across the coil 16, as previously described, and a condenser 69 is connected between ground and the terminal 19 of the rotor coil 16. The electric constants of the elements of this circuit are such as to constitute it an oscillator resonant at intermediate frequency.

The terminals 21 and 19 are brought to external binding posts 75 and 76, respectively, mounted on the plate 22. The palpator 40 is connected to the post 75 by a lead 77 and the vibrating electrode 42 is connected to the post 76 by a lead 78.

Stability with respect to grounds external to the device is provided by a ground connection between condensers 79 and 80 connected in series between leads 50 and 51. The disc 29 is grounded (grounding connection not illustrated) to minimize body capacity of the operator.

The operation of my detector is as follows. With the electrode 42 in the hand of the patient, the palpator 40 is placed between the first and second cervical vertebra with the edges of the channel bridging the spine. In this relationship the operator rubs his first three fingers in a circular motion over the field plate, thereby imparting an electrostatic charge to the condenser 12, and the operator at the same time slowly turns the dial knob 28 with one hand. As the point of resonance is approached, there will be a detectable drag or resistance to turning the rotor. I have found that this drag occurs at different positions of the rotor depending on the pathologic and psychopathic condition of the patient.

The rotor is carefully constructed to be statically and dynamically balanced, and the bearings 19 and 21 are antifriction ball bearings of precision grade. With this construction, a little practice should enable an operator to detect the drag with assurance.

From the circuit diagram of Fig. 5 it is seen that the impedance interposed between the electrodes 40 and 42 is a factor in determining the setting of the transformer 11 to establish resonance in the oscillatory circuit. As the impedance of the path through the patient's body is changed, by reason of physiological changes which vary capitance and/or inductance, resonance will occur at different settings of the rotor.

I have established that a number of disorders give definite and characteristic changes in dial setting from that distinguishing a person in normal health. Also, this instrument can be used to determine readily the overall state of vitality of a person, and when the electrodes are applied to certain surfaces of the body, the condition of specific organs.

It is to be understood that it is feasible and within the scope of my invention, to make this type of diagnosis by determining the condition of resonance and the frequency corresponding thereto, with indicating instruments, such as an ammeter and a frequency meter. It is obvious, however, that the embodiment heretofore described is outstandingly superior to such means because a single observation only is required, dependent on the sense of touch of the operator, leaving the vision free for other observations.

Although the invention has been described in considerable detail, such description is intended as illustrative rather than limiting, as other embodiments will be evident to those skilled in the art, as well as obvious modifications in construction and arrangement without departing from the spirit of the invention.

I claim:

1. An apparatus for determining the pathological condition of a person comprising a pair of electrodes for application to selected spaced parts of the body of said person, an electric circuit including an electronic oscillator having a variable air-core tuning transformer, and said electrodes being connected to said circuit in such manner that the impedance of the body between said parts forms part of the tuning circuit of said oscillator.

2. The invention set forth in claim 1 characterized in that said transformer has a rotatable coil and is provided with means for indicating the orientation of the rotor.

3. The invention set forth in claim 1 characterized in that said transformer is of the variometer type having a stator coil and a rotor coil rotatable into and out of inductive relation with the stator coil, and that said rotor coil is asymmetrically disposed with respect to its axis of rotation.

4. The invention set forth in claim 1 characterized in that said transformer is of the variometer type having a stator coil and a rotor coil rotatable into and out of inductive relation with the stator coil and asymmetrically disposed with respect to its axis of rotation, and that said circuit includes a disc condenser of relatively large diameter connected in multiple with said rotor coil and disposed adjacently thereto such that the capacitive coupling between said condenser and said rotor coil is varied as the rotor is turned.

5. The method of determining the high-frequency impedance over spaced parts of a human body which comprises applying to said parts by means of electrodes a high-frequency potential supplied by an electronic oscillator including a tuning circuit constructed and arranged such that the impedance of said body is in the tuning circuit of said oscillator.

MARTIN L. STANPHILL.

REFERENCES CITED

The following references are of record in the file of this patent:

UNITED STATES PATENTS

| Number | Name | Date |
| --- | --- | --- |
| 1,697,377 | Werner | Jan. 1, 1929 |
| 1,524,976 | Kaute | Feb. 3, 1925 |